Patented Apr. 30, 1935

UNITED STATES PATENT OFFICE 1,999,989

GLYOXALIDINEARYLMETHYLOLS AND PROCESS OF MAKING THEM

Max Bockmühl and Robert Knoll, Frankfort-on-the-Main, Germany, assignors to Winthrop Chemical Company, Inc., New York, N. Y., a corporation of New York No Drawing. Application July 11, 1933, Serial No. 679,983. In Germany July 9, 1931

12 Claims.   (Cl. 260—44)

Our present invention relates to μ-glyoxalidine-arylmethylols and a process of making them.

According to this invention basic compounds are obtained in which a glyoxalidine ring is linked to an aromatic nucleus by means of the methylol group, by causing an alkylene diamine to act upon an iminoether of mandelic acid having in the nucleus at least one free or etherified hydroxyl group.

The reaction may be carried out by causing an iminoether of mandelic acid containing at least one free hydroxyl group in the nucleus to react with an alkylene diamine. It is also possible to start from iminoethers of mandelic acid containing, in the nucleus etherified hydroxyl groups. If it is intended to obtain in this latter manner glyoxalidinearyl methylols with non-etherified phenolic hydroxyl groups, one starts from iminoethers of mandelic acid the hydroxyl hydrogens of which are exchanged for aralkyl radicals and splits off from the glyoxalidinearyl-methylol-aralkyl ethers the aralkyl radicals. For preparing glyoxalidinearyl-methylols the phenolic hydroxyl groups of which are etherified, one starts from iminoethers of mandelic acid the phenolic hydroxyl groups of which are etherified by mono-valent or bivalent hydrocarbon radicals. As examples of the first there may be named the monoalkyloxy compounds and the dialkyl-oxy compounds, as examples of the second the methylenedioxy compounds and the ethylenedi-oxy compounds. It is advantageous to use as starting materials the hydrohalides, for instance the hydrochlorides or hydrobromides, of mandelic acid iminoethers.

The products according to this invention may, if desired, be alkylated at the phenolic hydroxyl groups unless the latter are etherified. The new compounds are composed according to the following general structural formula:

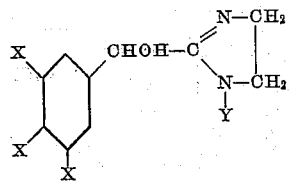

wherein one or two X's stand for the group $OR_1$, $R_1$ being hydrogen or an alkyl or aralkyl radical or two $R_1$ together being an alkylene radical, the remaining X stands for hydrogen and Y stands for hydrogen or an alkyl radical.

The new compounds have a pharmacological action or may be transformed into bodies having such an action.

The following examples illustrate the invention:

(1) 30 grams of meta-benzyloxymandelic acid iminoethylether hydrochloride, 100 cc. of absolute alcohol and 7 grams of ethylenediaminehydrate are heated together in a reflux apparatus for 5 hours. The alcohol is then distilled under reduced pressure. The residue which is at first an oil solidifies when it is triturated with acetone and forms the meta-benzyloxyphenylglyoxalidyl-carbinol hydrochloride.

37 grams of the product are hydrogenated in 500 cc. of absolute alcohol at about 60° C. to 70° C. with catalytically activated hydrogen. After cooling the catalyst is eliminated by filtering with suction and the filtrate is concentrated under reduced pressure. The meta-hydroxyphenylgly-oxalidylcarbinol hydrochloride which remains is triturated with acetone whereupon it solidifies. When recrystallized from a mixture of alcohol and acetone it forms fine white needles melting at 207° C. to 208° C.

(2) 60 grams of 3.4-methylenedioxymandelic acid iminoethylether hydrochloride are suspended in 150 cc. of alcohol, the suspension is mixed with 15 grams of ethylenediaminehydrate and the mixture is heated in a reflux apparatus for 5 hours. The solvent is distilled and the residue is triturated with ethyl acetate and alcohol. The 3.4-methylenedioxyphenylglyoxalidylcarbinol hydrochloride obtained is recrystallized from a mixture of ethyl acetate and alcohol and forms colorless prisms melting at 180° C. to 182° C.

(3) A mixture of 42.7 grams of 3.4-dibenzyl-oxymandelic acid iminoethylether hydrochloride, 250 cc. of absolute alcohol and 7.8 grams of ethylenediaminehydrate is heated in a reflux apparatus for 5 hours. The alcohol is distilled; the residue which is at first an oil solidifies when it is triturated with ethyl acetate and forms the 3.4-dibenzyloxyphenylglyoxalidylcarbinol hydrochloride. A solution of the latter in 400 cc. of absolute alcohol is hydrogenated with catalytically activated hydrogen until the calculated quantity of hydrogen has been absorbed. The catalyst is eliminated by filtering with suction and the filtrate is concentrated under reduced pressure. The 3.4-dihydroxyphenylglyoxalidylcarbinol hydrochloride which remains is recrystallized from a mixture of alcohol and ethyl acetate. It then forms colorless needles melting at 174° C. to 176° C.

(4) 46.2 grams of meta-hydroxymandelic acid iminoethylether hydrochloride are dissolved in 150 cc. of absolute alcohol, the solution is mixed with 14.2 grams of ethylenediaminehydrate and the mixture is heated in a reflux apparatus for 5 hours. The alcohol is distilled. From the residue which constitutes a resin-like mass there is obtained by repeated purification by way of alcohol and acetone the meta-hydroxyphenylglyoxalidylcarbinol hydrochloride described in example 1.

(5) 22.8 grams of meta-hydroxyphenylglyoxalidylcarbinol hydrochloride are dissolved in 200 cc. of water, 22 grams of calcined sodium carbonate are added and the mixture is methylated with 15 grams of dimethylsulfate. The base which precipitates is the meta-methoxyphenylglyoxalidylcarbinol. It crystallizes from aqueous alcohol in the form of colorless needles melting at 150° C. to 151° C. Its hydrochloride which when recrystallized from alcohol forms coarse prisms melts at 212° C.

(6) A mixture of 49 grams of para-methoxymandelic acid iminoethylether hydrochloride, 100 cc. of absolute alcohol and 15 grams of methylethylenediamine is heated in a reflux apparatus. The solvent is distilled, the residue is dissolved in water, the solution is mixed with animal charcoal and then filtered. By adding to the filtrate potassium carbonate, the para-methoxyphenyl-N-methylglyoxalidylcarbinol is obtained. The base crystallizes from a mixture of ethyl acetate and acetone in the form of colorless prisms melting at 135°. Its hydrochloride forms when recrystallized from a mixture of alcohol and ethyl acetate colorless laminae melting at 147° C. to 149° C.; its hydrobromide melts at 132° C. to 134° C.

(7) 31.8 grams of meta-benzyloxyphenylglyoxalidylcarbinol hydrochloride are introduced into a solution saturated with hydrochloric acid of 25 grams of stannous chloride in 250 cc. of absolute alcohol. After about 10 hours' standing the solution is diluted with 1 liter of water and the tin is eliminated by means of hydrogen sulfide, or in an electrolytic manner. The filtrate is evaporated under reduced pressure and the residue is recrystallized from alcohol and acetone. The product obtained is the meta-hydroxyphenylglyoxalidylcarbinol hydrochloride described in Example 1 which melts at 207° C. to 208° C.

(8) 27.7 grams of 3.5-dimethoxymandelic acid iminoethylether hydrochloride are suspended in 75 cc. of alcohol, 8 grams of ethylenediamine are added and the mixture is heated in a reflux apparatus for 5 hours. The solvent is distilled and the residue is transformed into a crystalline state by mixing it with ethyl acetate, while stirring. The 3.5-dimethoxyphenylglyoxalidylcarbinol hydrochloride obtained is recrystallized from methanol mixed with ether. It melts at 202° C. to 204° C.

We claim:

1. The process which comprises causing ethylenediamine to act at a temperature of about 70° C. to 80° C. upon meta-benzyloxymandelic acid iminoethylether hydrochloride.

2. The process which comprises causing ethylenediamine to act at a temperature of about 70° C. to 80° C. upon 3.4-dibenzyloxymandelic acid iminoethylether hydrochloride.

3. The process which comprises causing ethylenediamine to act at a temperature of about 70° C. to 80° C. upon 3.5-dimethoxymandelic acid iminoethylether hydrochloride.

4. The hydrochloride of the compound of the following formula:

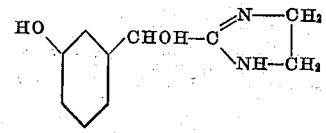

said compound forming fine white needles melting at 207° C. to 208° C.

5. The hydrochloride of the compound of the following formula:

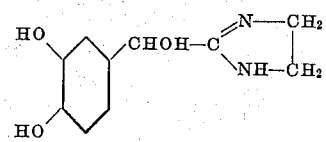

said compound forming colorless needles melting at 174° C. to 176° C.

6. The hydrochloride of the compound of the following formula:

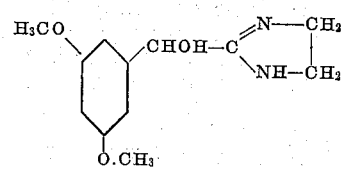

said compound melting at 202° C. to 204° C.

7. The process which comprises causing an alkylenediamine of the following formula:

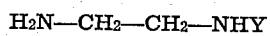

$H_2N-CH_2-CH_2-NHY$ wherein Y stands for hydrogen or methyl to act at a temperature of about 70° C. to 80° C. upon a compound of the following general formula:

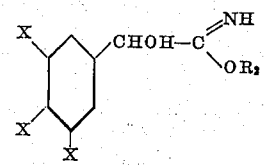

wherein not more than two X's stand for the group $OR_1$, $R_1$ being hydrogen or an alkyl or the benzyl radical or two $R_1$ together in adjacent position being a lower alkylene radical, the remaining X stands for hydrogen and $R_2$ stands for an alkyl radical.

8. The process which comprises causing an alkylenediamine of the following formula:

$H_2N-CH_2-CH_2-NHY$ wherein Y stands for hydrogen or methyl, to act at a temperature of about 70° C. to 80° C. upon a compound of the following general formula:

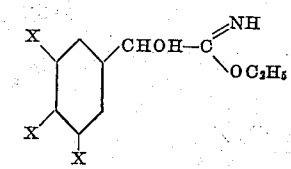

wherein not more than two X's stand for the group $OR_1$, $R_1$ being hydrogen or an alkyl or the benzyl radical or two $R_1$ together in adjacent position being a lower alkylene radical, the remaining X stands for hydrogen.

9. The process which comprises causing ethylenediamine to act at a temperature of about 70° C. to 80° C. upon a compound of the following general formula:

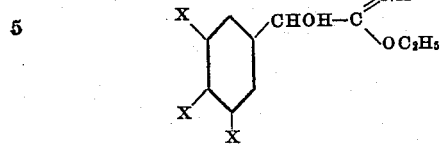

wherein not more than two X's stand for the group $OR_1$, $R_1$ being hydrogen or an alkyl or the benzyl radical or two $R_1$ together in adjacent position being a lower alkylene radical, the remaining X stands for hydrogen.

10. The process which comprises causing ethylenediamine to act at a temperature of about 70° C. to 80° C. upon a hydrohalide of a compound of the following general formula:

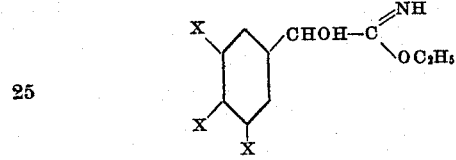

wherein not more than two X's stand for the group $OR_1$, $R_1$ being hydrogen or an alkyl or the benzyl radical or two $R_1$ together in adjacent position being a lower alkylene radical, the remaining X stands for hydrogen.

11. The hydrohalides of the compounds of the following general formula:

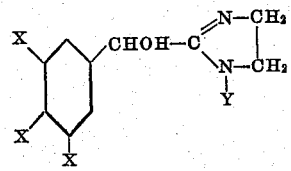

wherein not more than two X's stand for the group $OR_1$, $R_1$ being hydrogen or an alkyl or the benzyl radical or two $R_1$ together in adjacent position being a lower alkylene radical, the remaining X stands for hydrogen and Y stands for hydrogen or an alkyl radical, said compounds being colorless solid substances.

12. The hydrohalides of the compounds of the following general formula:

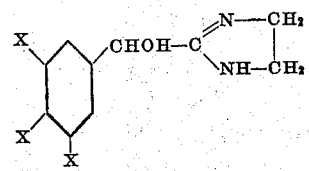

wherein not more than two X's stand for the group $OR_1$, $R_1$ being hydrogen or an alkyl or the benzyl radical or two $R_1$ together in adjacent position being a lower alkylene radical, the remaining X stands for hydrogen, said compounds being colorless solid substances.

MAX BOCKMÜHL.
ROBERT KNOLL.